United States Patent
Elsherbini et al.

(10) Patent No.: US 10,868,366 B2
(45) Date of Patent: Dec. 15, 2020

(54) PACKAGE ARCHITECTURE FOR ANTENNA ARRAYS

(71) Applicant: Intel Corporation, Santa Clara, CA (US)

(72) Inventors: Adel A. Elsherbini, Chandler, AZ (US); Shawna M. Liff, Scottsdale, AZ (US); William J. Lambert, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/465,980

(22) PCT Filed: Jan. 4, 2017

(86) PCT No.: PCT/US2017/012195
§ 371 (c)(1),
(2) Date: May 31, 2019

(87) PCT Pub. No.: WO2018/128606
PCT Pub. Date: Jul. 12, 2018

(65) Prior Publication Data
US 2020/0036095 A1    Jan. 30, 2020

(51) Int. Cl.
*H01Q 21/00* (2006.01)
*H04B 1/02* (2006.01)
(Continued)

(52) U.S. Cl.
CPC ........... *H01Q 3/34* (2013.01); *H01Q 21/0087* (2013.01); *H01Q 21/065* (2013.01); *H04B 1/02* (2013.01)

(58) Field of Classification Search
CPC .... H01Q 3/34; H01Q 21/0087; H01Q 21/065; H01Q 21/06; H01Q 21/0025; H04B 1/02
(Continued)

(56) References Cited

U.S. PATENT DOCUMENTS 6,067,047 A * 5/2000 Cook ................... H01Q 3/2605
333/156
2005/0057432 A1    3/2005 Anderson
(Continued)

FOREIGN PATENT DOCUMENTS

| CN | 103588782 | 2/2014 |
| EP | 2493014 | 8/2012 |
| WO | WO 2015171118 | 11/2015 |

OTHER PUBLICATIONS

International Search Report and Written Opinion for International Patent Application No. PCT/US2017/012195 dated Sep. 20, 2017, 12 pgs.
(Continued)

*Primary Examiner* — Lee Nguyen
(74) *Attorney, Agent, or Firm* — Schwabe, Williamson & Wyatt, P.C.

(57) ABSTRACT

Embodiments are generally directed to a package architecture for antenna arrays. An embodiment of an apparatus includes an electronic package, the electronic package including one or more routing layers; a transmitter to drive a signal for wireless transmission; and an assembled phased array antenna to transmit the signal, the assembled phased array antenna including a plurality of separate antenna elements in an array, each antenna element of the array being individually attached to a first side of the electronic package. The antenna elements include a first antenna element and a second antenna element, wherein the first antenna element is separated from the second antenna element by a gap.

25 Claims, 7 Drawing Sheets

(51) Int. Cl.
*H01Q 3/34* (2006.01)
*H01Q 21/06* (2006.01)

(58) Field of Classification Search
USPC .......................................................... 455/129
See application file for complete search history.

(56) References Cited

U.S. PATENT DOCUMENTS

| | | |
|---|---|---|
| 2011/0273347 A1 | 11/2011 | Wilkins |
| 2012/0075808 A1 | 3/2012 | Lee et al. |
| 2012/0188138 A1* | 7/2012 | Liu ...................... H01Q 1/2283 343/776 |
| 2012/0235880 A1 | 9/2012 | Kim |
| 2012/0235881 A1 | 9/2012 | Pan et al. |
| 2012/0280860 A1 | 11/2012 | Kamgaing et al. |
| 2014/0198013 A1 | 7/2014 | Saraswat et al. |
| 2014/0333480 A1* | 11/2014 | Kamgaing ........... H01Q 1/2283 342/368 |
| 2015/0325925 A1* | 11/2015 | Kamgaing .............. H01L 23/66 343/893 |

OTHER PUBLICATIONS

Office Action from Chinese Patent Application No. 201780074850.8, dated Sep. 10, 2020, 8 pgs.

\* cited by examiner

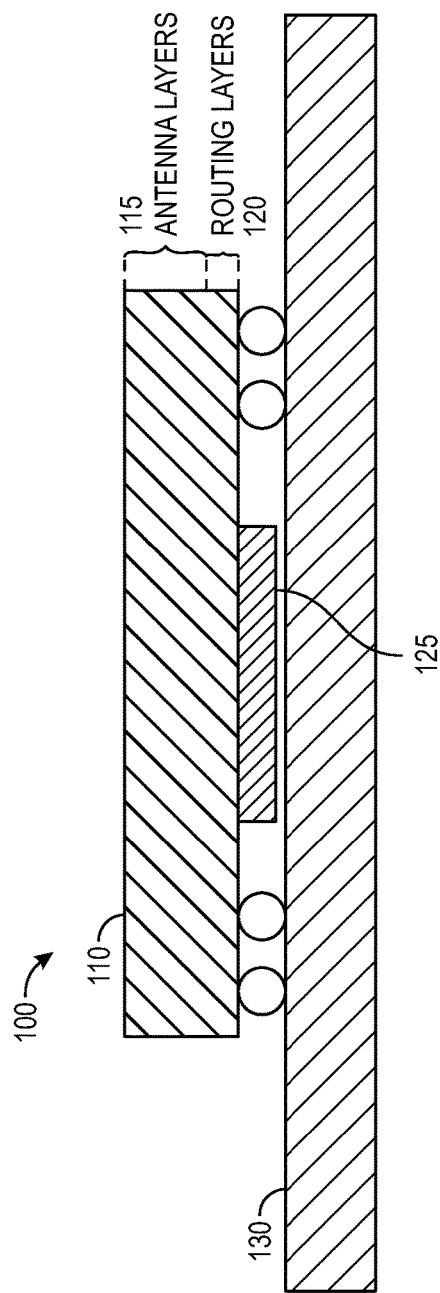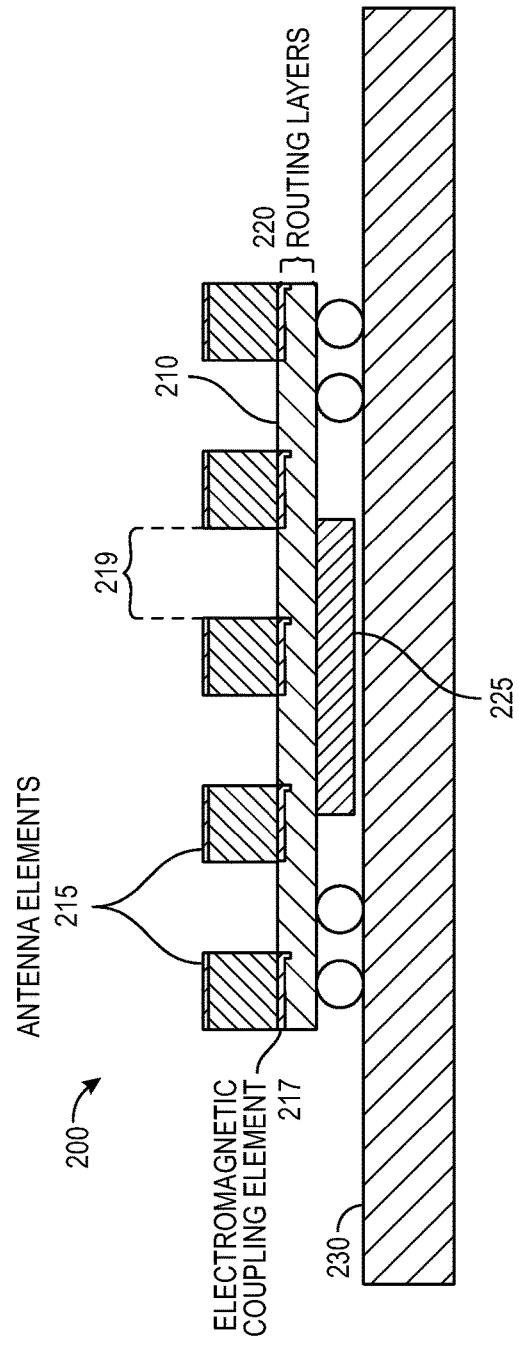

PACKAGE ARCHITECTURE FOR ANTENNA ARRAYS

CROSS-REFERENCE TO RELATED APPLICATION

This patent application is a U.S. National Phase Application under 35 U.S.C. § 371 of International Application No. PCT/US2017/012195, filed Jan. 4, 2017, entitled "PACKAGE ARCHITECTURE FOR ANTENNA ARRAYS," which designates the United States of America, the entire disclosure of which is hereby incorporated by reference in its entirety and for all purposes.

TECHNICAL FIELD

Embodiments described herein generally relate to the field of electronic devices and, more particularly, package architecture for antenna arrays.

BACKGROUND

Millimeter wave antennas operating in the 25-110 GHz (gigahertz) band are being investigated for use in next generation wireless devices to provide support for the higher frequencies.

A single element antenna at these frequencies will either be an electrically small antenna having a very wide beam allowing it to receive from many directions at the expense of very short transmission or receive distances at an acceptable signal to noise ratio, or an electrically large antenna that has a narrow beam allowing longer transmission/reception distances at the expense of a narrow reception angle.

For this reason, certain antenna designs employ a phased array antenna wherein several antenna elements are grouped together and the phase shift between the signals feeding the antenna elements is electrically adjusted to steer the resulting narrow beam in the desired direction, allowing for wider reception angles at improved transmission/reception distances.

However, the implementation of such a phased array antenna in a device may result in a risk of warpage that results from the difference in the coefficient of expansion for the antenna elements in comparison the other elements of the electronic package.

BRIEF DESCRIPTION OF THE DRAWINGS

Embodiments described here are illustrated by way of example, and not by way of limitation, in the figures of the accompanying drawings in which like reference numerals refer to similar elements.

FIG. 1 is an illustration of an exemplary package configuration for a phased array antenna assembly;

FIG. 2 is an illustration of a structure including individually attached antenna elements according to an embodiment;

DETAILED DESCRIPTION

Figure 3A:
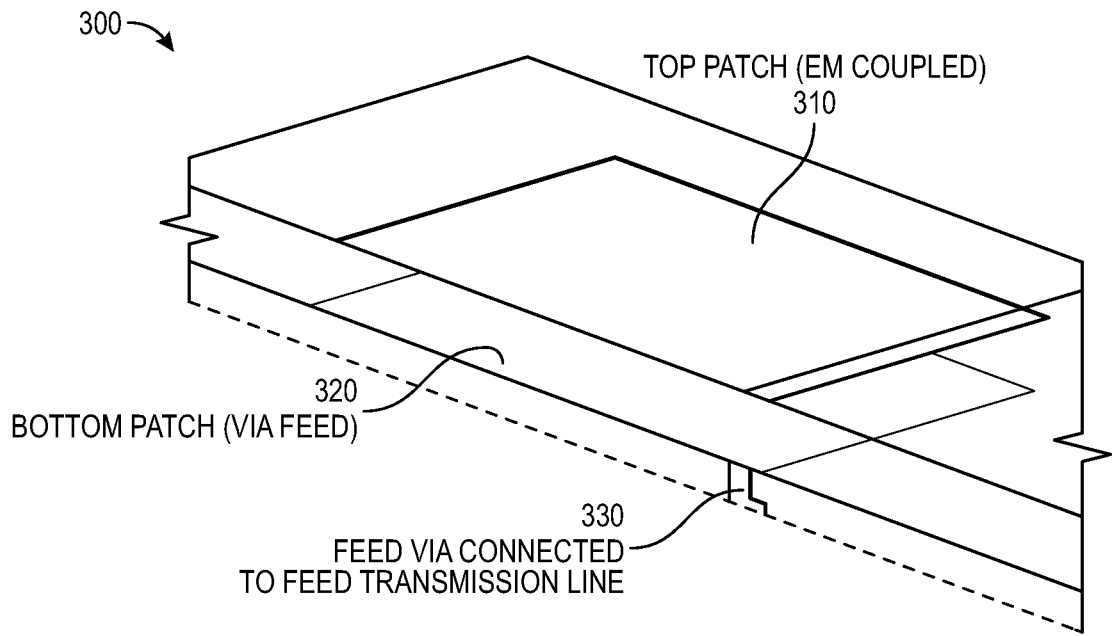
FIG. 3A is a cross section illustration of a conventional stacked patch antenna structure fabricated on a single dielectric sheet inside the package substrate.

Embodiments described herein are generally directed to package architecture for antenna arrays.

For the purposes of this description:

"Phased array antenna" refers to an array of antenna elements (which may also be referred to as antenna units or other similar term), wherein the feed current to each antenna in the array passes through a phase shifter to adjust the phase of the signal emitted by each antenna element and change the interference of the signals, and thus shift the direction of the radiation.

In some embodiments, a package architecture is provided to minimize package warpage and improve electrical performance in millimeterwave (wavelengths from 10 millimeters to 1 millimeter) and 5G (referring to 5th generation mobile networks and wireless networks) antenna arrays. In some embodiments, the architecture of an apparatus or system including an electronic package (also referred to herein as a package) includes multiple separate antenna elements to form a phased array antenna. The phased array antenna may be referred to as an assembled antenna as it is composed of multiple separate antenna elements that are assembled together by individually attaching the antenna elements to the package. As assembled antenna structure may be contrasted with a conventional integrated antenna structure.

Certain electronic package structures, particularly millimeter wave devices operating in the 25-110 GHz (gigahertz) band, utilize a phased array antenna having several separate antenna elements that are assembled together in an array, with the phase shift between the signals feeding the antenna elements being electrically adjusted to steer the resulting narrow radiation beam in the desired direction. A phased array antenna may include, for example, from 8 to 256 antennas in the package.

Phased array antenna elements are required to be relatively close to each other (about half the operating wavelength) to avoid degradation of the radiation pattern performance. However, to be able to transmit and receive over a relatively wide band, the antenna elements need to be relatively large and the copper density needs to be relatively low. A common approach to addressing this problem is to use relatively thick substrates (about 10-20% of the operating wavelength). However, this results in package manufacturing limitations due to panel and unit warpage, wherein the warpage results from the difference in materials between the antenna and routing components of the package causing differences in the rate of expansion of the resulting layers. The package warpage generates delamination forces and increases the risk of device failure. Possible approaches to addressing these issues in a package architecture include the following:

(a) Thick package stackup with a thick core: This package structure results in reduced routing density in the package and an asymmetric stackup for cored packages, resulting in assembly challenges due to package warpage at reflow temperature.

(b) Thin package stackup with an additional "glued" on thick dielectric layer with the antennas: This structure results in relatively high stresses on the glue used to bind the dielectric layer with the antenna elements, especially with multiple thermal cycling, and thus resulting in a high risk for delamination. Additionally this structure does not significantly help the package warpage because the antenna and routing layers remain tightly coupled.

(c) Thin package stackup with BGA (Ball Grid Array) attached thick antenna layer. This structure results in assembly challenges between the two packages and between the package and the board and heat sink. Additionally, the structure adds 50-100 um of Z height to the total package thickness through use of the BGA attachment without providing improvement in the antenna performance.

FIG. 1 is an illustration of an exemplary package configuration for a phased array antenna assembly. In this illustration, an apparatus 100 includes an electronic package 110 to which may be coupled to a die 125 beneath the package 110. The die 125 may include a chip with RF (Radio Frequency) circuits. Further, the package 110 may be coupled to a printed circuit board (PCB, generally referred to herein as a board) 130, such as utilizing the ball grid array (BGA) attachment illustrated in FIG. 1.

In the configuration illustrated in FIG. 1, the apparatus 100 contains the millimeter wave antenna layers 115, the antenna layers including multiple antenna elements in an array, and the routing layers 120. In this implementation the apparatus 100 includes the antenna layers 115 and routing layers 120 within the single package 110.

However, the difference in materials between the antenna layers 115 and the routing layers 120 results in a risk of warpage that can have a significant impact on the integrity of the package 110 and the complete apparatus 100. Further, the package structure may also serve to attenuate the power produced by the antenna array of the antenna layers 115.

In some embodiments, to address the structural and electrical limitations of the package configuration for a phased array antenna assembly, the antenna elements of the phased array are separated from the package structure, are divided or singulated to create multiple antenna elements, and are individually attached to the package containing the routing layers.

FIG. 2 is an illustration of a structure including individually attached antenna elements according to an embodiment. In some embodiments, an apparatus or system 200 includes multiple antenna elements 215 of a phased antenna array.

In contrast with the attachment of the antenna layers in a package, such as illustrated in FIG. 1, or otherwise coupling such layers to the routing layers, the multiple antenna elements 215 are each individually attached to an electronic package 210 including routing layers 220. In some embodiments, the antenna elements 215 are coupled via an electromagnetic coupling element 217 to an electronic package 210. In an alternative embodiment the antenna elements 215 are directly coupled to the electronic package. In some embodiments, the structure of the antenna includes separation or air gaps 219 between at least some of the antenna elements 215. In some embodiments, one or more of the antenna elements contains multiple antennas. In some embodiments, one or more of the antenna elements receive a signal via a cable or other wire connection.

In the illustrated embodiment, the electronic package 210 of the apparatus or system 200 may further be coupled to a die 225 beneath the electronic package 210. The die 225 may include a chip with RF circuits. While the die 225 is illustrated as being on a first (bottom) side of the package, while the antenna elements are coupled on the opposite second (top) side of the package, embodiments of an apparatus or system 200 are not limited to this structure. In some embodiments, the die 225 may be installed on a same side of the package as the antenna elements. In some embodiments, one or more components (which may be referred to as die-side components) are also attached to the electronic package 210 on the same side of the package as the die.

Further, the electronic package 210 may be coupled to a board 230, such as utilizing the BGA attachment illustrated in FIG. 2. However, embodiments are not limited to this particular structure, and may, for example, include other board and die attachments, such as land grid array (LGA), solder grid array (SGA), pin grid array (PGA), or socket attachment.

While for ease of illustration the antenna elements in an array of an assembled antenna structure are shown in the shape of flat rectangular prisms, embodiments are not limited to antenna elements in a flat rectangular prism shape. In some embodiments, antenna elements may include varying 3D topology to improve the electrical or mechanical performance while being compatible with fabrication processes, such as pick and place tools. Further, embodiments are not limited to antenna elements of uniform shape, size, material, or operating frequency. For example, an omnidirectional antenna may generally be required for an initial communication with a module during the phased array direction set up, and this communication can be made using larger antenna, or different antenna structure or material. Further, in some embodiments certain antennas, such as near a center of the antenna array, may be combined into a single substrate to simplify the pick and place process for larger packages.

Embodiments of an apparatus or system including an antenna array may include the following:

(1) An embodiment of an apparatus or system including multiple individually attached antennas instead of a single dielectric layer may provide for significant reductions in package warpage. Further, the stresses in the attachment area between the individual antenna elements and the package may be reduced compared to attaching a full dielectric layer due to the smaller element size relative to the array. Reductions in warpage and stress may provide improved reliability and reduced mechanical and thermal requirements on the adhesive.

(2) Overall fabrication costs for an apparatus may be reduced because of the relative simplicity in fabrication of each of the antenna elements. The multiple attached antennas can be, for example, cut out of un-patterned blank printed circuit boards (PCBs), as shown in the structure illustrated in FIG. 3B; generated utilizing 3D printing or screen printing; or other inexpensive fabrication process. Each individual antenna element includes a more uniform copper density distribution in comparison with an integrated antenna element, thus making the antenna assembly easier to handle and thus simplifying the overall fabrication process.

(3) In some embodiments, 3D patterned antennas may be implemented in an apparatus, which can provide significant improvement in the bandwidth of the antenna.

(4) Because a larger portion of the electric field is in air in comparison with the conventional structure such as illustrated in FIG. 1, the antenna efficiency can be significantly improved, especially if the package dielectrics in the conventional structure have relatively high loss tangent.

(5) In package substrate manufacturing, copper density may be required to be above a certain level to avoid current thieving during plating and to avoid panel warpage. The attainment of the required level of copper density may require the addition of dummy metal around the antenna, which thus can result in additional losses and undesired resonances.

(6) In the fabrication of an embodiment of a system or apparatus including multiple individually attached antennas, the antennas are generally added to the apparatus or system following the fabrication of the package, and thus can be placed closer to each other, thereby reducing the mechanical requirements on the package.

(7) If a wideband electromagnetic coupling element or direct coupling element is used on the package, different types of units can be assembled by simply attaching different elements (e.g. elements for slightly different frequencies for the United States, Europe, and Japan).

(8) Unconventional dielectrics and composites (such as, for example, ceramics and honeycomb structures with extremely low loss) may be used for the antenna element to achieve better performance for higher end devices (e.g., for implementation in base stations).

(9) Thick, continuous dielectric layers may give rise to substrate mode in phased array antennas, which results in undesired side lobes and reduction in the array gain at certain steering angle. The substrate mode effect may be significantly attenuated when using individual antenna elements with air separating the dielectric.

(10) Reduced thickness that is achieved for an apparatus or system compared to a BGA coupling process (by approximately 100 um) is achieved in comparison to standard substrate fabrication process, thus further improving performance.

Figure 3B:
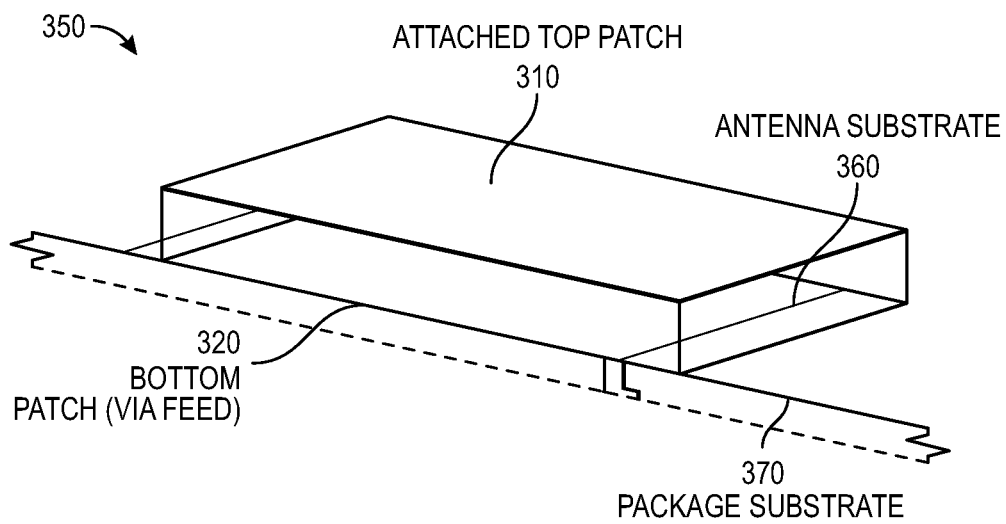
FIG. 3B is a cross section illustration of a stacked antenna structure fabricated in individual blocks according to an embodiment.
Figure 4A:
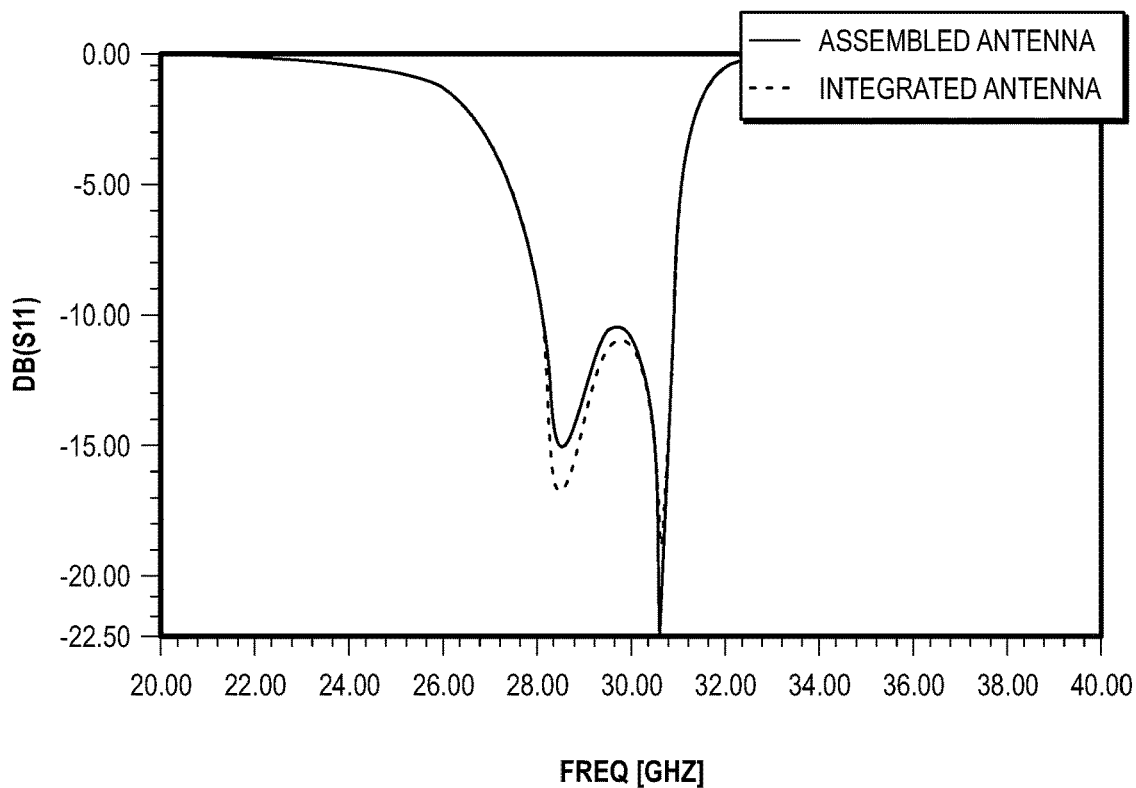
FIG. 4A is an illustration of reflection coefficient at the antenna port for integrated antenna and assembled antenna structures.
Figure 4B:
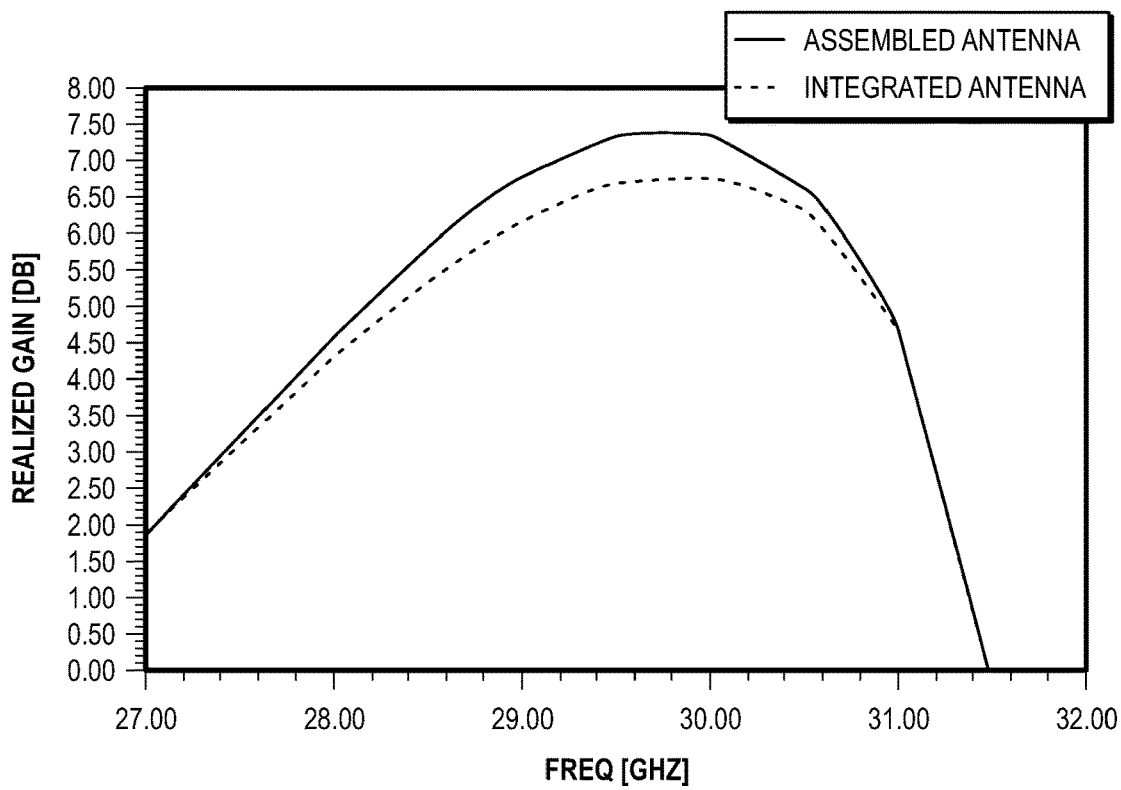
FIG. 4B is an illustration of realized gain for integrated antenna and assembled antenna structures.

FIG. 3A is a cross section illustration of a conventional stacked patch antenna structure 300 fabricated on a single dielectric sheet inside the package substrate. FIG. 3B is a cross section illustration of a stacked antenna structure 350 fabricated in individual blocks according to an embodiment. The structure 300 illustrated in FIG. 3A may be referred to as an integrated antenna, and the structure 350 illustrated in FIG. 3B may be referred to as an assembled antenna. The illustrated antenna structures utilize a stacked patch antenna concept including a top patch 310 and a bottom patch 320, wherein the top patch 310 is electromagnetically coupled to the bottom patch 320, and wherein the bottom patch 320 is directly connected to a feed transmission line using a feed via 330. As illustrated in FIG. 3B, the individual antenna blocks may each include an antenna substrate 360 separate from the package substrate 370. In some embodiments, an individual antenna block may contain more than one antenna, FIG. 4A is an illustration of reflection coefficient at the antenna port for integrated antenna and assembled antenna structures, and FIG. 4B is an illustration of realized gain for integrated antenna and assembled antenna structures. As illustrated in FIG. 4A, the reflection coefficient results for the integrated antenna structure (such as illustrated in FIG. 3A) and the assembled antenna structure (such as illustrated in FIG. 3B) show comparable performance in terms of return loss. However, the assembled antenna structure provides up to 0.7 dB (decibel) better realized gain in comparison with the integrated antenna structure, which corresponds to approximately 18% improvement in the radiated power. The improvement in radiated power may result at least in part from a reduction in the electromagnetic fields that are confined in the substrate compared to the dielectric, resulting in improved radiation efficiency. Further, the substrate mode is significantly attenuated for the assembled antenna structure in comparison with the integrated antenna structure, resulting in reduced side radiation for the assembled antenna structure.

In some embodiments, an antenna layer for an assembled antenna structure may be fabricated without requiring any patterning provided that the sawing accuracy is sufficient, such sawing accuracy less than approximately +/−50 μm (micrometers), which is achievable with current tools. The process without patterning may be implemented to further reduce the cost of fabrication of an apparatus or system. In additional, an assembled 3D antenna structure can be attached individually instead of attaching planar structures, which allow for alignment of antenna elements during fabrication to produce additional improvement in the bandwidth and the radiation efficiency.

Figure 5A:
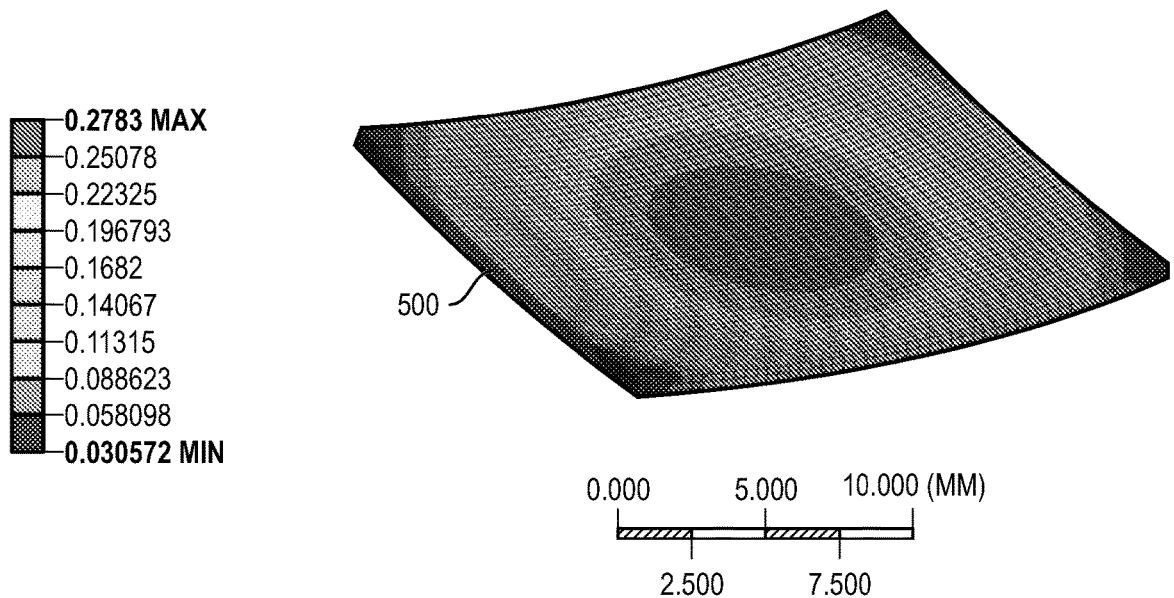
FIG. 5A is an illustration of package warpage for an integrated antenna structure with a thick antenna dielectric layer.
Figure 5B:
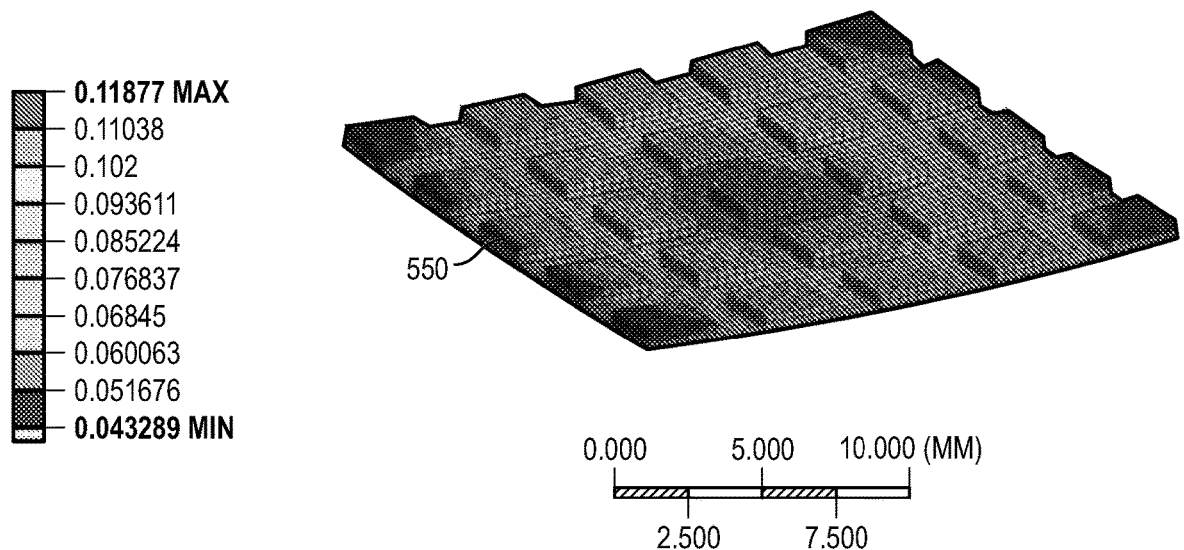
FIG. 5B is an illustration of package warpage for an assembled antenna structure according to an embodiment.

FIG. 5A is an illustration of package warpage for an integrated antenna structure 500 with a thick antenna dielectric layer. FIG. 5B is an illustration of package warpage for an assembled antenna structure 550 according to an embodiment. In some embodiments, an assembled antenna structure 550 may be implemented to reduce warpage in an apparatus or system including an antenna array. From a mechanical perspective an assembled antenna structure 550 can be implemented to provide significant improvement in package warpage compared to an antenna integrated in the package layers. While for ease of illustration the antenna elements within the array are shown as being uniform in shape and size, the antennas may vary in shape, size, and material. In some embodiments, one or more of the antenna elements contains two or more antennas.

For FIG. 5A, an integrated antenna structure 500 includes a thick dielectric antenna layer (such as approximately 0.5 mm) that is attached to a relatively thin package (approximately 0.1 mm). In contrast, for FIG. 5B an assembled antenna structure 550 is composed of individual antenna elements on a package. In both FIG. 5A and FIG. 5B, the structure is assumed to be flat at 25° C. (degrees Celsius), with the warpage being analyzed at the reflow temperature of 250° C. As shown in FIGS. 5A and 5B, the package warpage may be significantly reduced (by about 2.3 times in this example) when the antennas are separated in an assembled package in comparison with antennas in an integrated package.

Figure 6A:
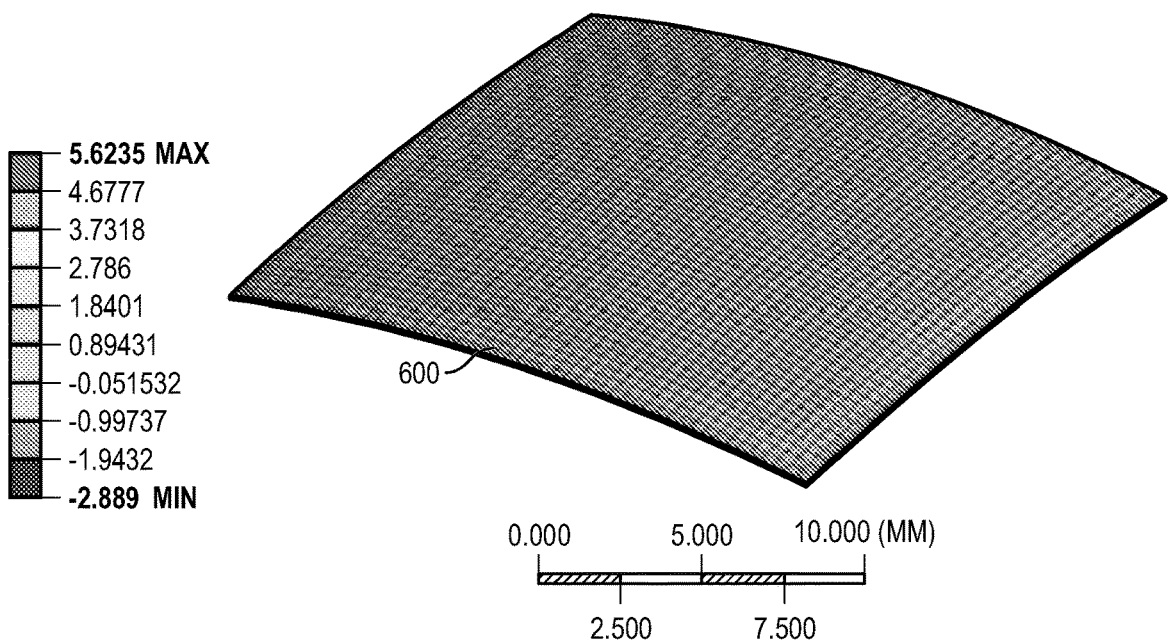
FIG. 6A is an illustration of structural pressure for an integrated antenna structure with a thick antenna dielectric layer.
Figure 6B:
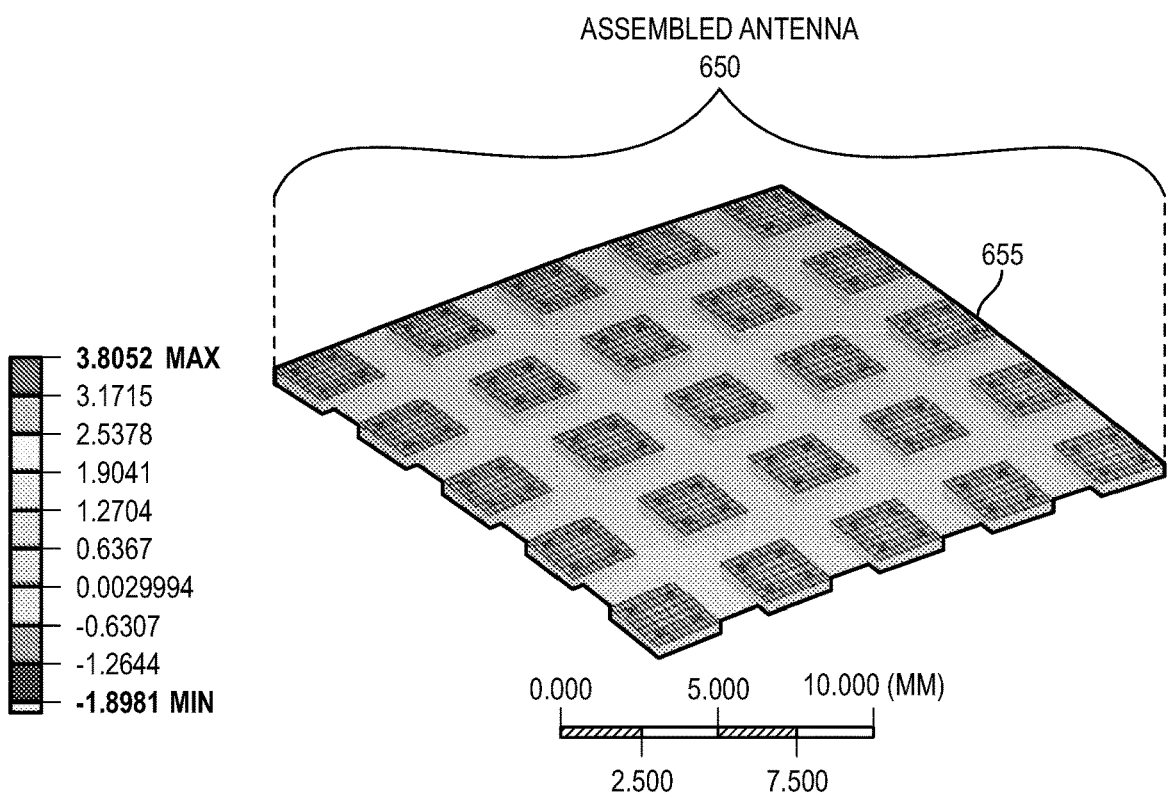
FIG. 6B is an illustration of structural pressure for an assembled antenna structure according to an embodiment.

FIG. 6A is an illustration of structural pressure for an integrated antenna structure 600 with a thick antenna dielectric layer. FIG. 6B is an illustration of structural stress for an assembled antenna structure 650 according to an embodiment. In addition to reduction in package warpage in an embodiment of an assembled antenna structure 650 including an array of antenna elements 655 in comparison with an integrated antenna structure 600, the stress at the contact points is reduced in an embodiment of an assembled antenna structure in comparison with an integrated antenna structure, as shown in FIGS. 6A and 6B.

The negative contact pressure is largely responsible for delamination in the antenna structure, and adds additional requirements on the adhesive. By separating the antenna layer into smaller assembled layers, as provided in an embodiment, the peel strength requirement on the adhesive decreases by approximately 50% in FIG. 6B as compared to FIG. 6A.

Figure 7:
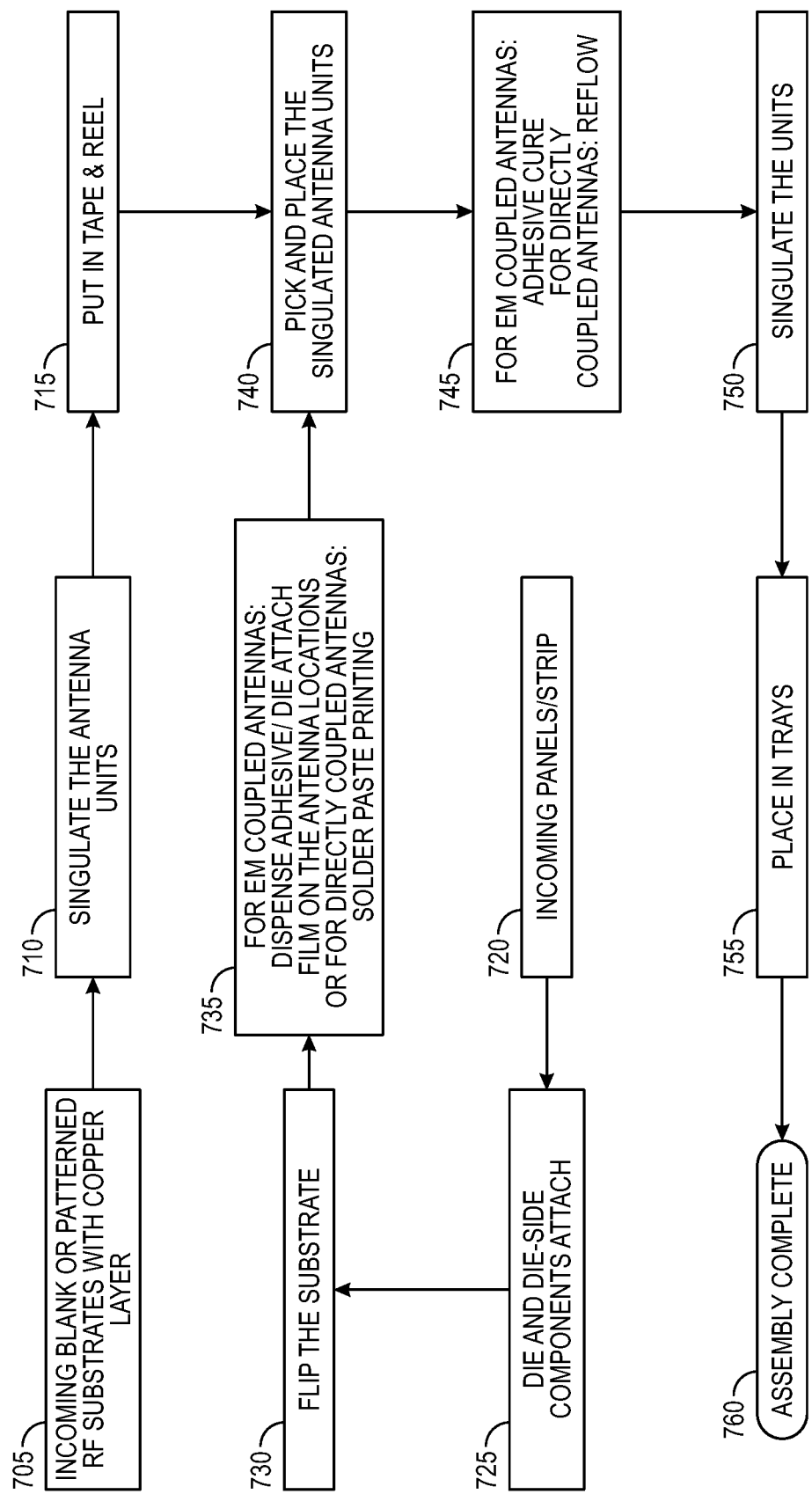
FIG. 7 is a flowchart to illustrate a process for fabrication of an apparatus or system including an assembled antenna array according to an embodiment.

FIG. 7 is a flowchart to illustrate a process for fabrication of an apparatus or system including an assembled antenna array according to an embodiment. In some embodiments, a process includes the following:

(a) An antenna unit fabrication process including:

705: Receiving blank or patterned RF substrates with copper layer. The substrates contain multiple antenna portions.

710: The antenna portions are singulated to produce multiple antenna units for assembly. In some embodiments, a single antenna unit may include two or more antennas.

715: Tape and reel are added for placement of the antenna units.

(b) An electronic package fabrication process including:

720: Receiving incoming panels or strip for the main routing package.

725: Attach a die and any die-side components, where the die may include die 225 illustrated in FIG. 2. In some embodiments, the attachment of a die or any die-side components may alternatively occur after or during the assembly process, process (c) with elements 740 to 760.

730: Flip the substrate.

735: For electromagnetically coupled antennas, dispense adhesive or die attach film on the antenna locations. For directly coupled antennas, proceed with solder paste printing or other related process.

(c) An assembly process including:

740: Individually attaching each of the singulated antenna units to the package to assemble the phased array antenna, wherein attaching the antenna units includes picking and placing the singulated antenna units on the package.

745: For electromagnetically coupled antennas, allow adhesive cure time. For directly coupled antennas, proceed solder reflow process.

750: Singulate the assembled apparatuses.

755: Placed the singulated apparatuses in trays.

760: Assembly of the apparatuses is complete.

Figure 8:
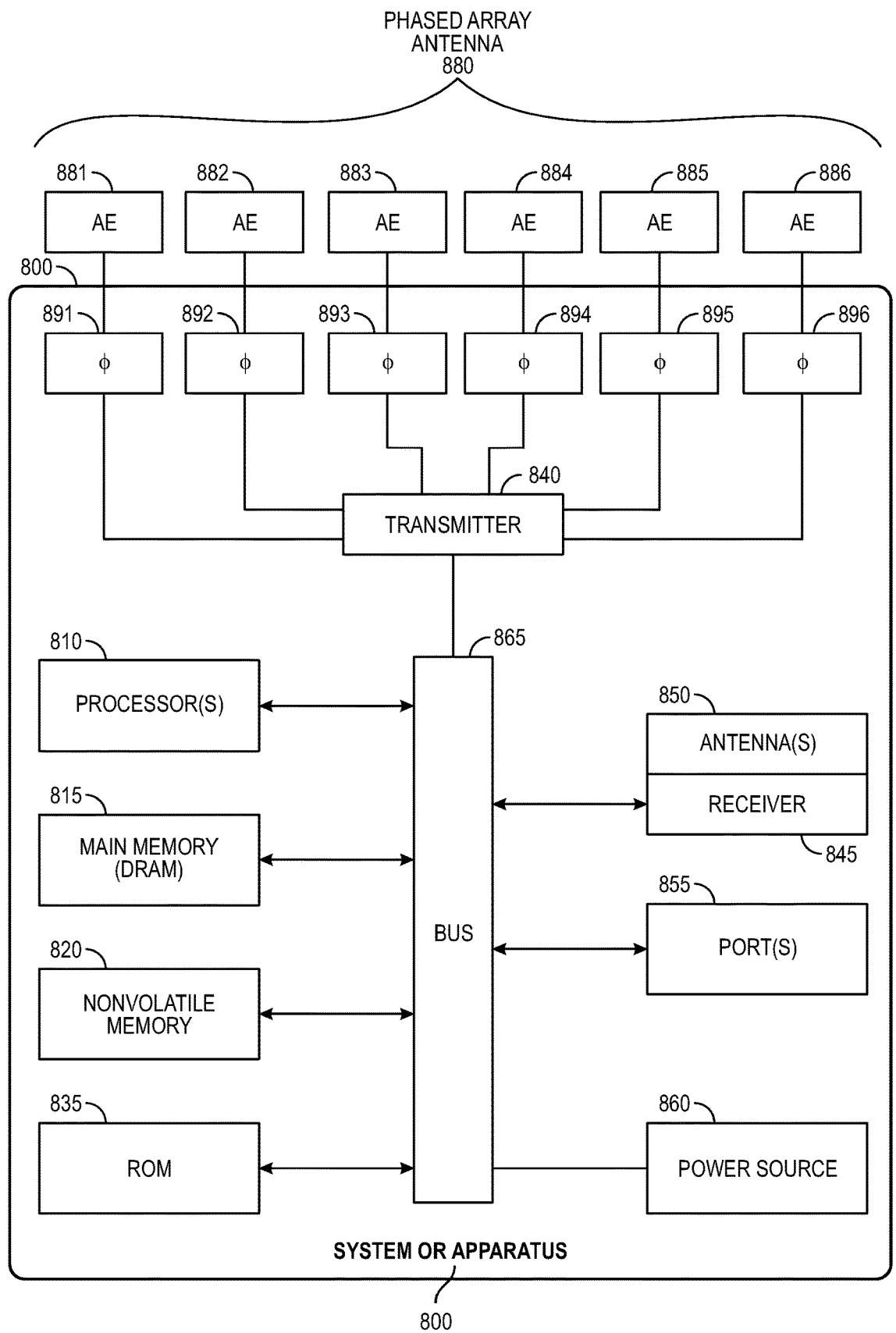
FIG. 8 is an illustration of a system or apparatus including an assembled antenna structure according to an embodiment.

FIG. 8 is an illustration of a system or apparatus including an assembled antenna structure according to an embodiment. In this illustration, certain standard and well-known components that are not germane to the present description are not shown. Elements shown as separate elements may be combined, including, for example, multiple elements on a single chip.

In some embodiments, a system or apparatus (generally referred to herein as a system), including, for example, a system on package, includes a phased array antenna 880, the phased array antenna including multiple separate antenna elements that are coupled with the package. The multiple antenna elements are illustrated herein as antenna elements (AE) 881 to 886.

In some embodiments, the antenna elements are installed on the package with appropriate spacing to for operation as a phased array antenna. In some embodiments, the system includes transmitter 840, with the transmitter providing signals for transmission to the antenna elements 881-886 via phase shift elements (designated as D) 891 to 896, the phase shift elements to provide the phase timing for operation of the phased array antenna 880.

In some embodiments, the system 800 may include a processing means such as one or more processors 810 coupled to one or more buses or interconnects, shown in general as bus 865. The processors 810 may comprise one or more physical processors and one or more logical processors. In some embodiments, the processors may include one or more general-purpose processors or special-processor processors. In addition to other functions, the processor 810 may provide for control of the phase elements 891-896.

The bus 865 is a communication means for transmission of data. The bus 865 is illustrated as a single bus for simplicity, but may represent multiple different interconnects or buses and the component connections to such interconnects or buses may vary. The bus 865 shown in FIG. 8 is an abstraction that represents any one or more separate physical buses, point-to-point connections, or both connected by appropriate bridges, adapters, or controllers.

In some embodiments, the system 800 further includes a receiver 845 for the reception of wireless data. The system may further include one or more additional antennas 850 for the reception of wireless data.

In some embodiments, the system 800 further comprises a random access memory (RAM) or other dynamic storage device or element as a main memory 815 for storing information and instructions to be executed by the processors 810. Main memory 815 may include, but is not limited to, dynamic random access memory (DRAM).

The system 800 may comprise a non-volatile memory 820; and a read only memory (ROM) 835 or other static storage device for storing static information and instructions for the processors 810. The system 800 may further include one or more ports 855 for the transmission and reception of data.

The system 800 may also comprise a battery or other power source 860, which may include a solar cell, a fuel cell, a charged capacitor, near field inductive coupling, or other system or device for providing or generating power in the system 800. The power provided by the power source 860 may be distributed as required to elements of the system 800.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus an electronic package, the electronic package including one or more routing layers; a transmitter to drive a signal for wireless transmission, and an assembled phased array antenna to transmit the signal, the assembled phased array antenna including a plurality of separate antenna elements in an array, each antenna element of the array being individually attached to a first side of the electronic package. In some embodiments, the plurality of antenna elements includes a first antenna element and a second antenna element, the first antenna element being separated from the second antenna element by a gap.

In some embodiments, the phased array antenna is a millimeter-wave antenna. In some embodiments, the transmitter operates in the 25-110 GHz (gigahertz) band.

In some embodiments, one or more of the plurality of antenna elements includes one or more antenna elements of a first size and one or more antenna elements of a second, different size.

In some embodiments, one or more of the plurality of antenna elements includes one or more antenna elements of a first shape and one or more antenna elements of a second, different shape.

In some embodiments, one or more of the plurality of antenna elements includes one or more antenna elements constructed of a first material and one or more antenna elements constructed of a second, different material.

In some embodiments, one or more of the plurality of antenna elements are electromagnetically coupled to the electronic package.

In some embodiments, one or more of the plurality of antenna elements are directly coupled to the electronic package.

In some embodiments, one or more of the plurality of antenna elements receive a signal via a cable or other wire connection.

In some embodiments, the apparatus further includes one or more phase elements to shift a phase of signals to be transmitted by one or more of the plurality of antenna elements.

In some embodiments, the apparatus further includes a die that is coupled to the electronic package.

In some embodiments, the die includes an RF (radio frequency) element.

In some embodiments, the die is coupled to a second side of the electronic package, the second side of the electronic package being an opposite side to the first side of the electronic package.

In some embodiments, the die is coupled to the first side of the electronic package. In some embodiments, the apparatus further includes a second die that is coupled to a second side of the electronic package, the second side of the electronic package being an opposite side to the first side of the electronic package.

In some embodiments, a method includes fabricating a plurality of antenna units, wherein fabricating the plurality of antenna units includes singulating the antenna units; fabricating an electronic package including a transmitter to drive a wireless signal; and assembling a phased array antenna by individually attaching the antenna units to a first side of the electronic package.

In some embodiments, the plurality of antenna units includes a first antenna unit and a second antenna unit, and wherein individually attaching the antenna units includes separating the first antenna unit and the second antenna unit by a gap.

In some embodiments, the phased array antenna is a millimeter-wave antenna. In some embodiments, the transmitter is a transmitter to operate in the 25-110 GHz (gigahertz) band.

In some embodiments, fabricating the antenna units includes fabricating the plurality of antenna units from one or more un-patterned printed circuit boards (PCBs).

In some embodiments, fabricating the electronic package further includes attaching a die to the electronic package.

In some embodiments, the die is an RF (radio frequency) element.

In some embodiments, attaching the die to the electronic package includes attaching the die to a second side of the electronic package, the second side being an opposite side to the first side.

In some embodiments, the method further includes attaching the electronic package to a printed circuit board.

In some embodiments, a first antenna unit is an electromagnetically (EM) coupled antenna unit, and wherein individually attaching the first antenna unit to the first side of the electronic package includes attaching the first antenna unit using an adhesive or attach film.

In some embodiments, a first antenna unit is a directly coupled antenna unit, and wherein individually attaching the first antenna unit to the first side of the electronic package includes attaching the first antenna unit using solder reflow or conductive adhesive.

In some embodiments, a system further includes an electronic package, the electronic package including one or more routing layers; a transmitter to drive a signal for wireless transmission; a phased array antenna to transmit the signal, the phased array antenna including a plurality of separate antenna elements in an array, the array of antenna elements being coupled to a first side of the electronic package; a die is coupled to a second side of the electronic package, the second side of the electronic package being an opposite side to the first side of the electronic package; and a circuit board, the circuit board being coupled to the second side of the electronic package. In some embodiments, the plurality of antenna elements includes a first antenna element and a second antenna element, the first antenna element being separated from the second antenna element by a gap.

In some embodiments, the phased array antenna is a millimeter-wave antenna.

In some embodiments, the transmitter operates in the 25-110 GHz (gigahertz) band.

In some embodiments, the electronic package is coupled with the circuit board by one of a ball grid array, land grid array (LGA), solder grid array (SGA), pin grid array (PGA), or socket attachment.

What is claimed is:

1. An apparatus comprising:
   an electronic package, the electronic package including one or more routing layers;
   a transmitter to drive a signal for wireless transmission; and
   an assembled phased array antenna to transmit the signal, the assembled phased array antenna including a plurality of separate antenna elements in an array, each antenna element of the array being individually attached to a first side of the electronic package;
   wherein the plurality of antenna elements includes a first antenna element and a second antenna element, the first antenna element being separated from the second antenna element by an air gap, the air gap laterally between the first antenna element and the second antenna element, wherein each of the first antenna element and the second antenna element includes an antenna package having a top surface and a bottom surface, a top patch on the top surface of the antenna package, and a bottom patch on the bottom surface of the antenna package, and wherein each of the first antenna element and the second antenna element is attached to the first side of the electronic package by the bottom patch.

2. The apparatus of claim 1, wherein the phased array antenna is a millimeter-wave antenna.

3. The apparatus of claim 1, wherein the transmitter operates in the 25-110 GHz (gigahertz) band.

4. The apparatus of claim 1, wherein one or more of the plurality of antenna elements includes one or more antenna elements of a first size and one or more antenna elements of a second, different size.

5. The apparatus of claim 1, wherein one or more of the plurality of antenna elements includes one or more antenna elements of a first shape and one or more antenna elements of a second, different shape.

6. The apparatus of claim 1, wherein one or more of the plurality of antenna elements includes one or more antenna elements constructed of a first material and one or more antenna elements constructed of a second, different material.

7. The apparatus of claim 1, wherein one or more of the plurality of antenna elements are electromagnetically coupled to the electronic package.

8. The apparatus of claim 1, wherein one or more of the plurality of antenna elements are directly coupled to the electronic package.

9. The apparatus of claim 1, wherein one or more of the plurality of antenna elements receive a signal via a cable or other wire connection.

10. The apparatus of claim 1, further comprising one or more phase elements to shift a phase of signals to be transmitted by one or more of the plurality of antenna elements.

11. The apparatus of claim 1, further comprising a die that is coupled to the electronic package.

12. The apparatus of claim 11, wherein the die includes an RF (radio frequency) element.

13. The apparatus of claim 11, wherein the die is coupled to a second side of the electronic package, the second side of the electronic package being an opposite side to the first side of the electronic package.

14. The apparatus of claim 11, wherein the die is coupled to the first side of the electronic package.

15. The apparatus of claim 14, further comprising a second die that is coupled to a second side of the electronic package, the second side of the electronic package being an opposite side to the first side of the electronic package.

16. A method comprising:
   fabricating a plurality of antenna units, wherein fabricating the plurality of antenna units includes singulating the antenna units;
   fabricating an electronic package including a transmitter to drive a wireless signal; and
   assembling a phased array antenna by individually attaching the antenna units to a first side of the electronic package;
   wherein the plurality of antenna units includes a first antenna unit and a second antenna unit, and wherein individually attaching the antenna units includes separating the first antenna unit and the second antenna unit by an air gap, the air gap laterally between the first antenna unit and the second antenna unit, wherein each of the first antenna unit and the second antenna unit includes an antenna package having a top surface and a bottom surface, a top patch on the top surface of the antenna package, and a bottom patch on the bottom surface of the antenna package, and wherein each of the first antenna unit and the second antenna unit is attached to the first side of the electronic package by the bottom patch.

17. The method of claim 16, wherein fabricating the antenna units includes fabricating the plurality of antenna units from one or more un-patterned printed circuit boards (PCBs).

18. The method of claim 16, wherein fabricating the electronic package further includes:
attaching a die to the electronic package.

19. The method of claim 18, wherein the die is an RF (radio frequency) element.

20. The method of claim 18, wherein attaching the die to the electronic package includes attaching the die to a second side of the electronic package, the second side being an opposite side to the first side.

21. The method of claim 16, further comprising attaching the electronic package to a printed circuit board.

22. The method of claim 16, wherein the first antenna unit is an electromagnetically (EM) coupled antenna unit, and wherein individually attaching the first antenna unit to the first side of the electronic package includes attaching the first antenna unit using an adhesive or attach film.

23. The method of claim 16, wherein the first antenna unit is a directly coupled antenna unit, and wherein individually attaching the first antenna unit to the first side of the electronic package includes attaching the first antenna unit using solder reflow or conductive adhesive.

24. A system comprising:
an electronic package, the electronic package including one or more routing layers;
a transmitter to drive a signal for wireless transmission;
a phased array antenna to transmit the signal, the phased array antenna including a plurality of separate antenna elements in an array, the array of antenna elements being coupled to a first side of the electronic package;
a die is coupled to a second side of the electronic package, the second side of the electronic package being an opposite side to the first side of the electronic package; and
a circuit board, the circuit board being coupled to the second side of the electronic package;
wherein the plurality of antenna elements includes a first antenna element and a second antenna element, the first antenna element being separated from the second antenna element by an air gap, the air gap laterally between the first antenna element and the second antenna element, wherein each of the first antenna element and the second antenna element includes an antenna package having a top surface and a bottom surface, a top patch on the top surface of the antenna package, and a bottom patch on the bottom surface of the antenna package, and wherein each of the first antenna element and the second antenna element is attached to the first side of the electronic package by the bottom patch.

25. The system of claim 24, wherein the phased array antenna is a millimeter-wave antenna.

* * * * *